(12) United States Patent
Okumura

(10) Patent No.: US 8,537,289 B2
(45) Date of Patent: Sep. 17, 2013

(54) PROJECTOR

(75) Inventor: Osamu Okumura, Chino (JP)

(73) Assignee: Seiko Epson Corporation, Tokyo (JP)

( * ) Notice: Subject to any disclaimer, the term of this patent is extended or adjusted under 35 U.S.C. 154(b) by 66 days.

(21) Appl. No.: 13/402,108

(22) Filed: Feb. 22, 2012

(65) Prior Publication Data
US 2012/0229715 A1 Sep. 13, 2012

(30) Foreign Application Priority Data
Mar. 7, 2011 (JP) .................................. 2011-049673

(51) Int. Cl.
*G02F 1/1335* (2006.01)

(52) U.S. Cl.
USPC ............................................ 349/5; 349/161

(58) Field of Classification Search
None
See application file for complete search history.

(56) References Cited

U.S. PATENT DOCUMENTS

| 6,885,412 | B2 | 4/2005 | Ohnishi et al. |
| 7,705,922 | B2 | 4/2010 | Zheng et al. |
| 2007/0019118 | A1* | 1/2007 | Nakagawa et al. ............... 349/5 |

FOREIGN PATENT DOCUMENTS

| JP | 10-39414 A | 2/1998 |
| JP | 11-64895 A | 3/1999 |
| JP | 2004-139018 A | 5/2004 |
| JP | 2005-227485 A | 8/2005 |
| JP | 2008-257174 A | 10/2008 |

* cited by examiner

*Primary Examiner* — Richard Kim
(74) *Attorney, Agent, or Firm* — ALG Intellectual Property, LLC

(57) ABSTRACT

A projector includes an illumination optical system capable of emitting first light and second light of a wavelength longer than that of the first light; a first liquid crystal panel constituted so as to include a first liquid crystal layer and capable of modulating the first light emitted from the illumination optical system; a second liquid crystal panel constituted so as to include a second liquid crystal layer having a transition temperature from a liquid crystal phase to an isotropic phase higher than that of the first liquid crystal layer and capable of modulating the second light emitted from the illumination optical system; a projection optical system projecting the first light modulated by the first liquid crystal panel and the second light modulated by the second liquid crystal panel; and a cooling mechanism for cooling the first liquid crystal layer.

1 Claim, 3 Drawing Sheets

PROJECTOR

BACKGROUND

1. Technical Field

The present invention relates to a projector.

2. Related Art

A projector can form an image by modulating light emitted from an illumination optical system with, for example, a liquid crystal panel and enlarge and project the formed image with a projection optical system. As one of projectors, a three-plate-type liquid crystal projector having a liquid crystal panel for each of RGB colors is known.

In the liquid crystal projector, the size of the liquid crystal panel is small compared to the screen size, and the quantity of light entering a liquid crystal layer is high per unit area compared to a direct viewing-type liquid crystal display device. Accordingly, in the liquid crystal projector, the temperature of the liquid crystal layer tends to become high compared to the direct viewing-type liquid crystal display device, and the transition temperature of the liquid crystal layer to an isotropic phase is set to be high from the viewpoint of, for example, ensuring heat resistance. The compound used in the liquid crystal layer has a tendency that the transition temperature to an isotropic phase increases with the length of the π-electron conjugated system, and the transition temperature of the liquid crystal layer to an isotropic phase can be set to high by increasing the ratio of the compound having a long π-electron conjugated system in the liquid crystal layer.

However, the absorption wavelength of the compound used in the liquid crystal layer tends to shift from the ultraviolet region toward the longer wavelength side with an increase in length of the π-electron conjugated system. Consequently, the increase in ratio of the compound having a long π-electron conjugated system tends to cause decomposition of the liquid crystal layer due to light absorption, in particular, decomposition of the liquid crystal layer of the liquid crystal panel for modulating blue light. The progress of decomposition of the liquid crystal layer impairs display characteristics through reductions in contrast ratio, lightness, etc.

From the viewpoint of inhibiting the liquid crystal layer of the blue liquid crystal panel from being decomposed by light absorption, methods of cooling the blue liquid crystal panel to a temperature lower than those of other color liquid crystal panels are proposed in JP-A-10-39414, JP-A-2005-227485, and JP-A-2008-257174. According to these methods, the chemical reaction decomposing the liquid crystal layer can be inhibited from progressing, and the life of the blue liquid crystal panel can be prevented from becoming shorter than those of the other color liquid crystal panels. In addition, JP-A-2004-139018 discloses a method of controlling the temperature of a liquid crystal layer from the viewpoint of improving responsiveness of the liquid crystal layer.

SUMMARY

The projector has been being developed to show higher brightness and to have a further reduced size and is therefore expected to further increase the light resistance of liquid crystal layers. Accordingly, the above-mentioned known methods need to be improved for further increasing light resistance of liquid crystal layers. An advantage of some aspects of the invention is a projector that can improve the light resistance.

The projector of the invention includes an illumination optical system capable of emitting first light in a blue wavelength range and second light of a wavelength longer than that of the first light; a first liquid crystal panel constituted so as to include a first liquid crystal layer and capable of modulating the first light emitted from the illumination optical system; a second liquid crystal panel constituted so as to include a second liquid crystal layer having a transition temperature from a liquid crystal phase to an isotropic phase higher than that of the first liquid crystal layer and capable of modulating the second light emitted from the illumination optical system; a projection optical system projecting the first light modulated by the first liquid crystal panel and the second light modulated by the second liquid crystal panel; and a cooling mechanism for cooling the first liquid crystal layer so that the temperature of the first liquid crystal layer is lower than that of the second liquid crystal layer.

By doing so, the first liquid crystal layer has a lower transition temperature compared to the case of forming the first liquid crystal layer by the same liquid crystal material as that forming the second liquid crystal layer, and thereby the light entering from the illumination optical system is less absorbed by the first liquid crystal layer. Accordingly, the liquid crystal material of the first liquid crystal layer is prevented from being decomposed by light absorption, and the first liquid crystal layer is therefore prevented from reducing the life by degradation due to decomposition, etc. The cooling mechanism cools the first liquid crystal layer so that the temperature of the first liquid crystal layer is lower than that of the second liquid crystal layer and can thereby inhibit the progress of decomposition reaction of the first liquid crystal layer. Furthermore, the first liquid crystal layer is prevented from shifting to an isotropic phase, even though the transition temperature of the first liquid crystal layer is lower than that of the second liquid crystal layer.

BRIEF DESCRIPTION OF THE DRAWINGS

The invention will be described with reference to the accompanying drawings, wherein like numbers reference like elements.

DESCRIPTION OF EXEMPLARY EMBODIMENT

An embodiment of the present invention will now be described with reference to the drawings. The dimension and scaling of the structures shown in drawings used in description may differ from the actual ones.

Figure 1:
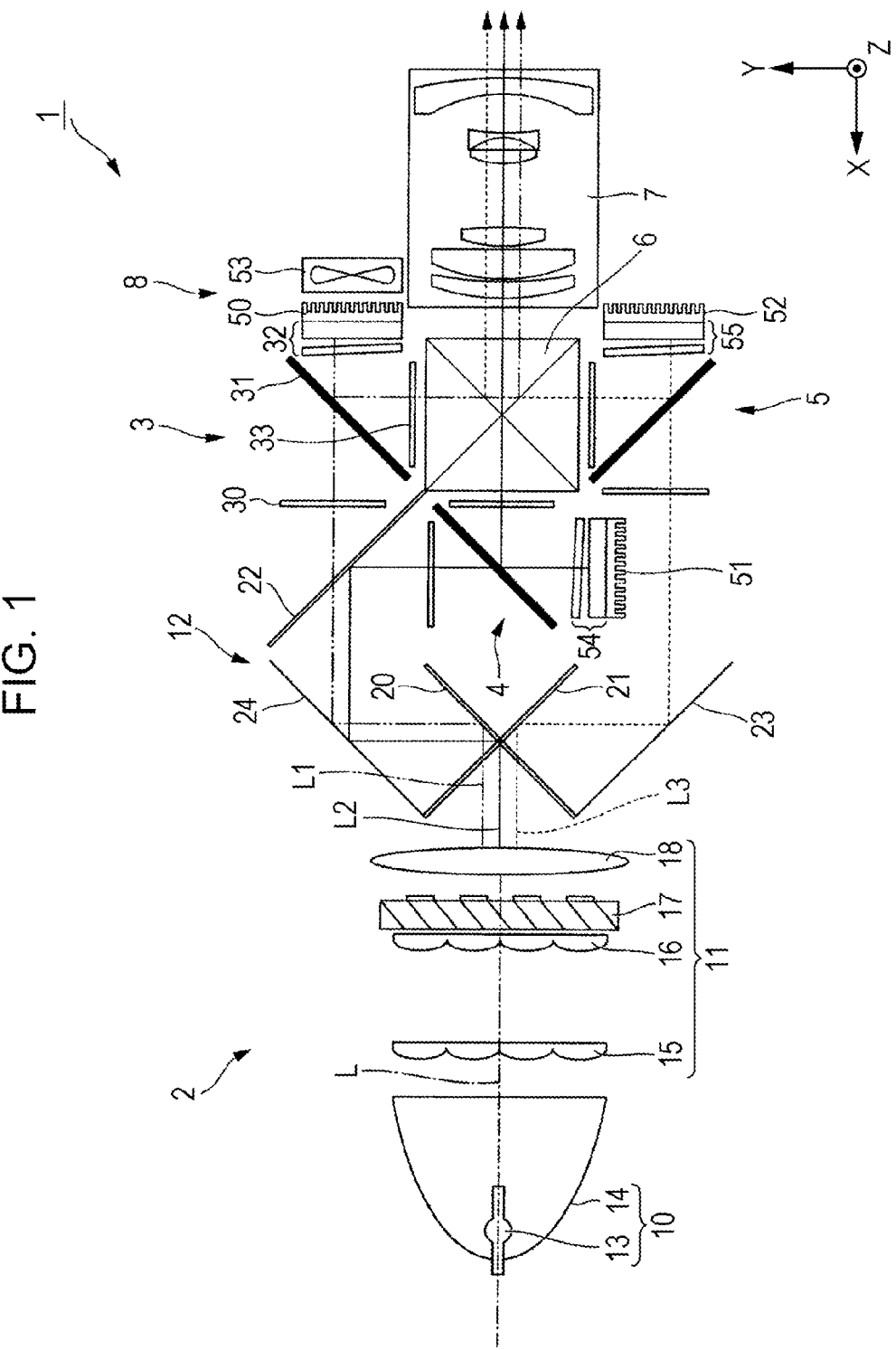
FIG. 1 is a diagram schematically illustrating the structure of a projector according to an embodiment.
Figure 2:
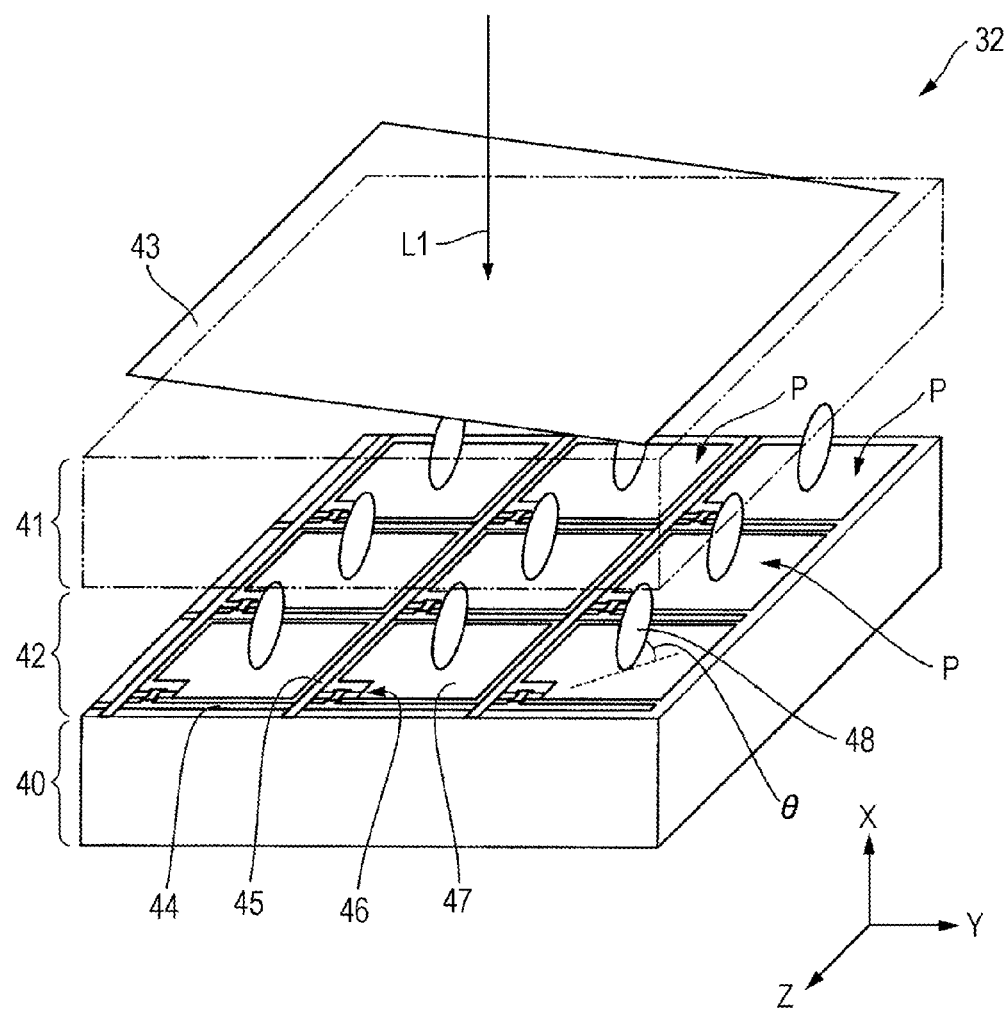
FIG. 2 is a diagram schematically illustrating the structure of a liquid crystal panel.

FIG. 1 is a diagram schematically illustrating the structure of a projector according to this embodiment. FIG. 2 is a diagram schematically illustrating the structure of a liquid crystal panel. The projector 1 shown in FIG. 1 includes an illumination optical system 2, a blue image-forming system 3, a green image-forming system 4, a red image-forming system 5, a color synthesizing unit 6, a projection optical system 7, and a cooling mechanism 8.

The illumination optical system 2 can emit first light in a blue wavelength range (hereinafter, referred to as blue light L1), second light of a wavelength longer than that of the first light (hereinafter, referred to as green light L2), and third light of a wavelength longer than that of the second light (hereinafter, referred to as red light L3), independently. The illumination optical system 2 of this embodiment includes a light source unit 10, integrator optical system 11, and color separation optical system 12.

The light source unit 10 can emit white light L containing a blue light L1 component of a wavelength of 450 nm or more and less than 495 nm, a green light L2 component of a wavelength of 495 nm or more and less than 570 nm, and a red light L3 component of a wavelength of 620 nm or more and less than 750 nm. The integrator optical system 11 can uniformize the illuminance of white light L emitted from the light source unit 10 to make the polarization uniform. The color separation optical system 12 can separate the white light L emitted from the integrator optical system 11 into blue light L1, green light L2, and red light L3 components.

The light source unit 10 of this embodiment includes a light source lamp 13 radiating white light and a reflector 14 having a reflection surface of a paraboloid of revolution. White light radiated from the light source lamp 13 is reflected in one direction by the reflector 14 to form substantially parallel light rays. The light source lamp 13 is constituted by, for example, a metal halide lamp, a xenon lamp, an extra-high pressure mercury lamp, or a halogen lamp. The reflector 14 reflects light into the integrator optical system 11. The reflection surface of the reflector 14 may be an ellipsoid of revolution. In such a case, a collimating lens for collimating the white light emitted from the reflector may be used.

The integrator optical system 11 of the present invention includes a first lens array 15, a second lens array 16, polarization converting element 17, and a auxiliary lens (a converting lens) 18.

The first lens array 15 and the second lens array 16 each include a plurality of microlenses two-dimensionally arrayed on a plane orthogonal to the optical axis of the light source unit 10. The microlenses of the first lens array 15 are disposed so as to correspond to the microlenses of the second lens array 16 in a one-to-one manner. The plurality of microlenses in the plane orthogonal to the optical axis of the light source unit 10 has a shape (here, approximately rectangle) similar to the target illumination area of a first liquid crystal panel 32 described below. The target illumination area is an area including the entire area where a plurality of pixels are arrayed in the first liquid crystal panel 32.

The polarization converting element 17 includes a plurality of cells two-dimensionally arrayed on a plane orthogonal to the optical axis of the light source unit 10. The cells of the polarization converting element 17 are disposed so as to correspond to the microlenses of the second lens array 16 in a one-to-one manner. The plurality of cells each include a polarization beam splitter film (hereinafter, referred to as PBS film), a ½ phase plate, and a reflection mirror.

The incident white light L on the first lens array 15 from the light source unit 10 is condensed by each of the microlenses and is divided into a plurality of partial luminous fluxes. The partial luminous fluxes emitted from each microlens of the first lens array 15 form an image on the corresponding microlens of the second lens array 16 to form a secondary light source in the microlens. The partial luminous fluxes emitted from each microlens of the second lens array 16 enter the corresponding cell of the polarization converting element 17.

The polarization converting element 17 is disposed in the optical path between the second lens array 16 and the auxiliary lens (the converting lens) 18. The partial luminous fluxes entered each cell of the polarization converting element 17 are separated into P-polarization and S-polarization with respect to the PBS film. One of the separated polarizations is reflected by the reflection mirror and then passes through the ½ phase plate to coordinate the polarization with the other. In this embodiment, each cell of the polarization converting element 17 can coordinate the polarization of the partial luminous fluxes entered each cell to the P-polarization with respect to a polarizing element 31 (described below) of each image forming system. The plurality of partial luminous fluxes emitted from the plurality of cells of the polarization converting element 17 are refracted by the auxiliary lens (the converting lens) 18 and are thereby superimposed on the target illumination area of the first liquid crystal panel 32 of each image forming system.

The color separation optical system 12 includes a first dichroic mirror 20, a second dichroic mirror 21, a third dichroic mirror 22, a first reflection mirror 23, and a second reflection mirror 24. The first dichroic mirror 20 has a property that red light L3 passes therethrough and green light L2 and blue light L1 are reflected thereby. The second dichroic mirror 21 has a property that red light L3 is reflected thereby and green light L2 and blue light L1 passes therethrough. The third dichroic mirror 22 has a property that green light L2 is reflected thereby and blue light L1 passes therethrough. The first dichroic mirror 20 and the second dichroic mirror 21 are disposed so as to be substantially orthogonal to each other and to form an angle of substantially 45° with respect to the optical axis of the integrator optical system 11.

The red light L3 component in the incident white light L on the color separation optical system 12 is reflected by the second dichroic mirror 21, is then reflected by the first reflection mirror 23, and then enters the red image-forming system 5. The blue light L1 component and the green light L2 component in the incident white light L on the color separation optical system 12 are reflected by the first dichroic mirror 20, are then reflected by the second reflection mirror 24, and then enter the third dichroic mirror 22. The incident green light L2 on the third dichroic mirror 22 is reflected by the third dichroic mirror 22 and enters the green image-forming system 4. The incident blue light L1 on the third dichroic mirror 22 passes through the third dichroic mirror 22 and enters the blue image-forming system 3.

The blue image-forming system 3, the green image-forming system 4, and the red image-forming system 5 have approximately the same configurations excepting the following properties of the liquid crystal layers of the liquid crystal panels. In this embodiment, as the configuration of each image forming system, the blue image-forming system 3 will be representatively described. The blue image-forming system 3 includes an incident-side polarizing plate 30, a polarizing element 31, a first liquid crystal panel 32, and emission-side polarizing plate 33.

The blue light L1 emitted from the color separation optical system 12 enters the incident-side polarizing plate 30, then enters the polarizing element 31, and then enters the first liquid crystal panel 32. The incident blue light L1 on the first liquid crystal panel 32 is modulated and reflected by the first liquid crystal panel 32 and then reenters the polarizing element 31. The emission-side polarizing plate 33 is disposed at a position so that the blue light L1 reflected by the first liquid crystal panel 32 and then reflected by the polarizing element 31 enters the emission-side polarizing plate 33.

The polarizing element 31 is disposed in the optical path between the incident-side polarizing plate 30 and the first liquid crystal panel 32 so as to be inclined with respect to the optical path (here, approximately 45°). The polarizing element 31 has a property that the P-polarization of the incident blue light L1 passes therethrough and the S-polarization is reflected thereby. The polarizing element 31 of this embodiment is a wire grid-type polarizing element and includes a dielectric layer made of, for example, glass and a plurality of metal wire lines extending in the direction parallel to the S-polarization with respect to the polarizing element 31. The polarizing element 31 may be a polarization beam splitter prism.

The incident-side polarizing plate 30 and the emission-side polarizing plate 33 each have a property that linearly polarized light parallel to the transmission axis passes therethrough and linearly polarized light parallel to the absorption axis orthogonal to the transmission axis is absorbed thereby. The transmission axis of the incident-side polarizing plate 30 is set to be substantially parallel to the P-polarization with respect to the polarizing element 31. The transmission axis of the emission-side polarizing plate 33 is set to be substantially parallel to the S-polarization with respect to the polarizing element 31.

As shown in FIG. 2, the first liquid crystal panel 32 includes an element substrate 40, a counter substrate 41, a first liquid crystal layer 42, and a compensating plate 43. The element substrate 40 is disposed so as to face the counter substrate 41. The first liquid crystal layer 42 is sealed between the element substrate 40 and the counter substrate 41. The compensating plate 43 is disposed on the opposite side of the first liquid crystal layer 42 with respect to the counter substrate 41.

The first liquid crystal panel 32 of this embodiment is a reflection-type liquid crystal panel. The blue light L1 passed through the polarizing element 31 from the incident-side polarizing plate 30 side enters the compensating plate 43, passes through the counter substrate 41, then enters the first liquid crystal layer 42, and is then reflected by the element substrate 40 to turn back. The blue light L1 is modulated during the passing through the first liquid crystal layer 42 and is emitted from the first liquid crystal layer 42, enters the counter substrate 41, and then passes through the compensating plate 43 to be emitted from the first liquid crystal panel 32.

The element substrate 40 is constituted of a silicon substrate or a glass substrate as the base substance. In the case of using a silicon substrate, the element substrate 40 is so-called liquid crystal on silicon (LCOS). The element substrate 40 includes a plurality of gate lines 44, a plurality of source lines 45, a plurality of thin-film transistors (hereinafter, referred to as TFTs 46), and pixel electrodes 47.

The plurality of gate lines 44 extend parallel to each other. The plurality of source lines 45 extend parallel to each other. The extending direction (Y direction) of the gate lines 44 crosses (here, at right angles) the extending direction (Z direction) of the source lines 45. The TFT 46 is disposed at each of the crossing portions of the gate lines 44 and the source lines 45. The gate line 44 is electrically connected to the gate electrode of the TFT 46. The source line 45 is electrically connected to the source region of the TFT 46.

Each area surrounded by the gate lines 44 and the source lines 45 corresponds to one pixel P. The pixel electrodes 47 are disposed so as to correspond to the pixels P in a one-to-one manner. The pixel electrodes 47 of this embodiment are made of a metal material and also function as specular reflection plates. FIG. 2 schematically illustrates the backing side of the pixel electrodes 47 by cutting the pixel electrodes 47. Actually, the pixel electrode 47 covers the gate line 44, the source line 45, and the TFT 46 through a planarizing layer and an insulating layer to increase the aperture ratio of the pixel P. The pixel electrode 47 is electrically connected to the drain region of the TFT 46. The pixel electrode 47 is covered by an oriented film (not shown).

The counter substrate 41 is constituted of a substrate having transparency, such as a glass substrate, as the base substance. A common electrode made of a transparent electrically conductive material such as indium tin oxide is disposed on the first liquid crystal layer 42 side of the counter substrate 41. An oriented film is disposed on the first liquid crystal layer 42 side of the common electrode. The oriented films provided to the element substrate 40 and the counter substrate 41 are inorganic oriented films formed by, for example, oblique deposition.

The first liquid crystal layer 42 is constituted of a liquid crystal layer of, for example, a VA mode or a TN mode. In the case of employing a VA mode liquid crystal layer, the cell gap between the element substrate 40 and the counter substrate 41 is, for example, about 2.0 μm, and a liquid crystal material is sealed in this cell gap to constitute the first liquid crystal layer 42. The liquid crystal material has negative dielectric anisotropy and a birefringence Δn of, for example, 0.12. Each liquid crystal molecule 48 contained in the first liquid crystal layer 42 forms a pre-tilt angle θ of, for example, about 87° with respect to the direction (0°) along the surface of the element substrate 40. The compensating plate 43 is constituted of, for example, a negative C-plate. The compensating plate 43 is disposed so as to be inclined with respect to the direction along the surface of the element substrate 40 by about 4.5° for compensating the phase difference caused by the pre-tilt of the liquid crystal molecule 48.

In the first liquid crystal panel 32 having a configuration as described above, a select pulse is supplied to a gate line 44 to turn on the TFTs 46 connected to this gate line 44. In the state that the TFTs 46 are turned on, a source signal corresponding to a gray scale value of each pixel P is supplied to the source line 45, and the source signal is supplied to the pixel electrode 47 through the TFT 46. By the supply of the source signal to the pixel electrode 47, an electric field is applied between this pixel electrode 47 and the common electrode. The liquid crystal molecule 48 of the first liquid crystal layer 42 in each pixel P changes its azimuthal angle according to this electric field. Incident blue light L1 on a pixel P changes its polarization according to the azimuthal angle of the liquid crystal molecule 48 of the first liquid crystal layer 42 in this pixel P.

In this embodiment, in the state that the first liquid crystal layer 42 in an arbitrary pixel P is not applied with an electric field, incident blue light L1 on this pixel P does not change its polarization and is emitted as P-polarized light. In the state that the first liquid crystal layer 42 in an arbitrary pixel P is applied with an electric field, incident blue light L1 on this pixel P changes the P-polarization with respect to the polarizing element 31 to S-polarization at a ratio according to the gray scale value defined by the image data. That is, this S-polarized light with respect to the polarizing element 31 in the blue light L1 that has passed through the first liquid crystal layer 42 is the light showing an image.

The P-polarized light with respect to the polarizing element 31 in the blue light L1 emitted from the first liquid crystal panel 32 passes through the polarizing element 31. The S-polarized light with respect to the polarizing element 31 in the blue light L1 emitted from the first liquid crystal panel 32 is reflected by the polarizing element 31 to change its direction of travel and enters the emission-side polarizing plate 33. The S-polarized light with respect to the polarizing element 31 in the incident blue light L1 on the emission-side polarizing plate 33 passes through the emission-side polarizing plate 33 and enters the color synthesizing unit 6.

The color synthesizing unit 6 is constituted of, for example, a dichroic prism. The dichroic prism has a structure where four triangular prisms are attached to one another. The attaching surfaces of each triangular prism are inner surfaces of the dichroic prism. The dichroic prism has a structure in which two wavelength selection films formed on the inner surfaces so as to be at right angles to each other, where one of the wavelength selection films has a property that red light L3 is reflected thereby and green light L2 and blue light L1 pass therethrough, and the other wavelength selection film has a property that blue light L1 is reflected thereby and green light L2 and red light L3 pass therethrough.

Incident green light L2 on the dichroic prism passes through the wavelength selection films and is directly emitted. Incident blue light L1 and red light L3 on the dichroic prism are selectively reflected by or pass through the wavelength selection films and are emitted in the same direction as that of emission of the green light L2. Thus, three color light components are superimposed and synthesized into synthesized light for a full color image and enter the projection optical system 7. This synthesized light forms an image on a projection surface by the projection optical system 7 to display the full color image on the projection surface.

The cooling mechanism 8 of this embodiment includes a first radiator plate 50, a second radiator plate 51, a third radiator plate 52, and a coolant supply unit 53 supplying a coolant, such as air, so as to come into contact with the first to third radiator plates 50 to 52.

Each of the first to third radiator plates 50 to 52 is disposed on the opposite side of the incident-side, where the light from the illumination optical system enters, with respect to the liquid crystal panel of each image-forming system. The first radiator plate 50 is in contact with the first liquid crystal panel 32 of the blue image-forming system 3. The first radiator plate 50 may be a part of the first liquid crystal panel 32 or may be a constitutional element other than the first liquid crystal panel 32 in the blue image-forming system 3.

The second radiator plate 51 is in contact with the second liquid crystal panel 54 of the green image-forming system 4. The third radiator plate 52 is in contact with the third liquid crystal panel 55 of the red image-forming system 5. As in the first radiator plate 50, each of the second radiator plate 51 and the third radiator plate 52 may be a part of the liquid crystal panel or may be a constitutional element other than the liquid crystal panel in each image forming system.

The first to third radiator plates 50 to 52 are each made of a metal material excellent in thermal conductivity, such as an aluminum alloy, and each have a large number of tabular fins. The first to third radiator plates 50 to 52 can receive heat from the corresponding liquid crystal panels with which the radiator plates are in contact.

The coolant supply unit 53 of this embodiment is constituted so that the supplied coolant is first brought into contact with the first radiator plate 50 among the first to third radiator plates 50 to 52. The coolant supply unit 53 of this embodiment is constituted of, for example, a fan that can blow a coolant toward the first radiator plate 50. The coolant supplied from the coolant supply unit 53 is brought into contact with the first radiator plate 50 to absorb the heat conducted from the first liquid crystal layer 42 of the first liquid crystal panel 32 to the first radiator plate 50. Thus, the coolant supply unit 53 can cool the first liquid crystal layer 42.

The coolant supplied from the coolant supply unit 53, after the contact with the first radiator plate 50, is brought into contact with the second radiator plate 51 or the third radiator plate 52. As a result, the coolant supply unit 53 can cool the liquid crystal layer (second liquid crystal layer) of the second liquid crystal panel 54 for green light and the liquid crystal layer (third liquid crystal layer) of the third liquid crystal panel 55 for red light.

In this embodiment, the coolant supplied from the coolant supply unit 53 and brought into contact with the first radiator plate 50 is brought into contact with the second radiator plate 51 and then with the third radiator plate 52. The temperature of the coolant is increased by the contact with each radiator plate. That is, the temperature of the coolant when it comes into contact with the first radiator plate 50 is lower than the temperature of the coolant when it comes into contact with the second radiator plate 51. Similarly, the temperature of the coolant when it comes into contact with the second radiator plate 51 is lower than the temperature of the coolant when it comes into contact with the third radiator plate 52. Consequently, the second liquid crystal layer of the second liquid crystal panel 54 for green light corresponding to the second radiator plate 51 is cooled to a temperature lower than the third liquid crystal layer of the third liquid crystal panel 55 for red light corresponding to the third radiator plate 52. Furthermore, the first liquid crystal layer 42 of the first liquid crystal panel 32 for blue light corresponding to the first radiator plate 50 is cooled to a temperature lower than the second liquid crystal layer of the second liquid crystal panel 54 for green light corresponding to the second radiator plate 51.

Next, the function of the cooling mechanism 8 and the properties of the liquid crystal layer will be described using specific numerical examples. The following Table 1 shows the results of experiments investigating a relationship between external temperatures of a projector and temperatures of the liquid crystal layer of liquid crystal panel of each color image-forming system when an image is being formed. The temperature of a liquid crystal layer distributes in the surface direction orthogonal to the thickness direction thereof, and each column of Table 1 shows the maximum temperature of a liquid crystal layer (the temperature at the center in the surface direction of the liquid crystal layer) and the minimum temperature of the liquid crystal layer (the temperature at the periphery in the surface direction of the liquid crystal layer).

TABLE 1

| External temperature | First liquid crystal layer for blue light | Second liquid crystal layer for green light | Third liquid crystal layer for red light |
| --- | --- | --- | --- |
| 15° C. | 26 to 39° C. | 30 to 44° C. | 33 to 47° C. |
| 25° C. | 36 to 50° C. | 41 to 58° C. | 45 to 61° C. |
| 35° C. | 46 to 64° C. | 52 to 73° C. | 56 to 77° C. |

As shown in Table 1, when the external temperature is 15° C., the temperature of the first liquid crystal layer is higher than the external temperature by about 11 to 24° C., the temperature of the second liquid crystal layer is higher than the external temperature by about 15 to 29° C., and the temperature of the third liquid crystal layer is higher than the external temperature by about 18 to 32° C. When the external temperature is 25° C., the temperature of the first liquid crystal layer is higher than the external temperature by about 11 to 25° C., the temperature of the second liquid crystal layer is higher than the external temperature by about 16 to 33° C., and the temperature of the third liquid crystal layer is higher than the external temperature by about 20 to 36° C. When the external temperature is 35° C., the temperature of the first liquid crystal layer is higher than the external temperature by about 11 to 29° C., the temperature of the second liquid crystal layer is higher than the external temperature by about 17 to 38° C., and the temperature of the third liquid crystal layer is higher than the external temperature by about 21 to 42° C. Thus, by focusing on the difference between the maximum temperature of each liquid crystal layer and the external temperature, it is confirmed that the second liquid crystal layer of the second liquid crystal panel 54 for green light is cooled to a lower temperature than the third liquid crystal layer of the third liquid crystal panel 55 for red light, and the first liquid crystal layer (first liquid crystal layer 42) of the first liquid crystal panel 32 for blue light is cooled to a lower temperature than the second liquid crystal layer of the second liquid crystal panel 54 for green light.

Figure 3:
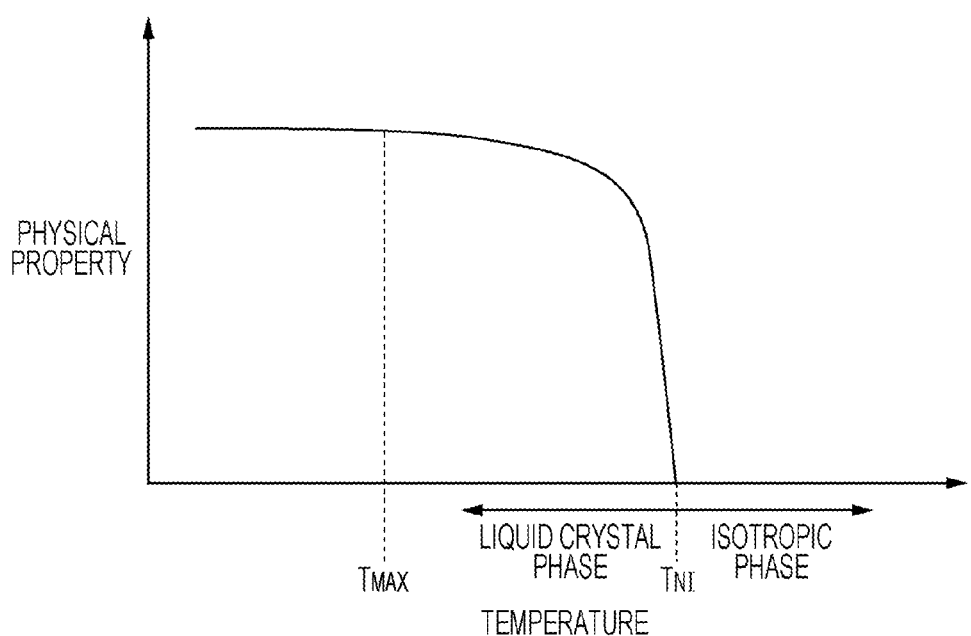
FIG. 3 is a graph for describing properties of a liquid crystal layer.

FIG. 3 is a graph describing properties of a liquid crystal layer. In the graph shown in FIG. 3, the vertical axis shows the physical property of anisotropy (dielectric anisotropy $\Delta\epsilon$ or birefringence $\Delta n$) of a liquid crystal layer, and the horizontal axis shows the temperature of the liquid crystal layer. The sign $T_{NI}$ in FIG. 3 shows the transition temperature from a liquid crystal phase to an isotropic phase.

As shown in FIG. 3, the liquid crystal layer rapidly loses the anisotropy when the temperature of the liquid crystal layer approaches the transition temperature $T_{NI}$. Actually, the liquid crystal layer is constituted so that the transition temperature $T_{NI}$ is higher than the maximum temperature $T_{MAX}$ of the liquid crystal layer when each image-forming system is forming an image by about 20 to 30° C. By doing so, the liquid crystal layer stably exhibits the anisotropy when the each image-forming system is forming an image.

In usual operating environment, the external temperature of a projector 1 is presumed to be 35° C. or less, and in the example shown in Table 1, the maximum temperature $T_{MAX}$ of the first liquid crystal layer when the external temperature is 35° C. is about 64° C. Accordingly, the transition temperature $T_{NI}$ of the first liquid crystal layer may be about 95° C. Similarly, the transition temperature $T_{NI}$ of the second liquid crystal layer may be about 105° C., and the transition temperature $T_{NI}$ of the third liquid crystal layer may be about 110° C.

In this embodiment, the first liquid crystal layer of the first liquid crystal panel 32 for blue light is constituted so that the transition temperature $T_{NI}$ is lower than that of the second liquid crystal layer of the second liquid crystal panel 54 for green light. The first liquid crystal layer of the first liquid crystal panel 32 for blue light is also constituted so that the transition temperature $T_{NI}$ is lower than that of the third liquid crystal layer of the third liquid crystal panel 55 for red light. In this embodiment, the transition temperature $T_{NI}$ of the first liquid crystal layer is about 96° C., the transition temperature $T_{NI}$ of the second liquid crystal layer and the transition temperature $T_{NI}$ of the third liquid crystal layer are about 110° C.

In this embodiment, the first to third liquid crystal layers all contain a plurality of compounds appropriately selected from compounds that are usually used as liquid crystal materials. Specific examples of the compounds that are usually used as liquid crystal materials of TN mode liquid crystal layers are shown by the following Formulae (1) to (4):

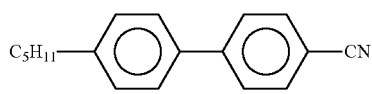

Formula (1)

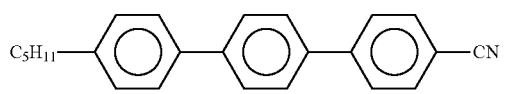

Formula (2)

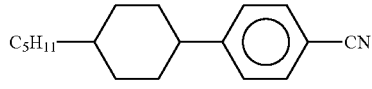

Formula (3)

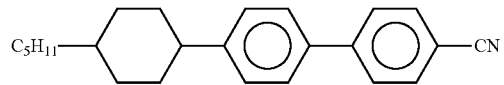

Formula (4)

The cyanobiphenyl compound shown by Formula (1) has a transition temperature $T_{NI}$ of 35.3° C., the cyanoterphenyl compound shown by Formula (2) has a transition temperature $T_{NI}$ of 240° C., the cyanophenylcyclohexane compound shown by Formula (3) has a transition temperature $T_{NI}$ of 55° C., and the cyanobiphenylcyclohexane compound shown by Formula (4) has a transition temperature $T_{NI}$ of 219° C. Comparison of the transition temperatures $T_{NI}$ between the compounds shown by Formulae (1) and (2) and between the compounds shown by Formulae (3) and (4) shows a tendency that the transition temperature $T_{NI}$ increases with the number of benzene rings constituting the $\pi$-electron conjugated system.

In the first liquid crystal layer of this embodiment, the content of a compound having a relatively higher transition temperature $T_{NI}$ in the compounds contained in liquid crystal material of the first liquid crystal layer is lower than the content in the second liquid crystal layer, and, thereby, the overall transition temperature $T_{NI}$ of the first liquid crystal layer is lower than that of the second liquid crystal layer. The third liquid crystal layer of this embodiment is formed of the same liquid crystal material as that of the second liquid crystal layer.

In general, since the $\pi$-$\pi$* transition probability increases with the number of benzene rings in a compound constituting the $\pi$-electron conjugated system, the absorption wavelength on the ultraviolet region side shifts to the longer wavelength side. The first liquid crystal layer of this embodiment contains a compound having a large number of benzene rings in a less amount than the case of forming the first liquid crystal layer by the same liquid crystal material as that of the second liquid crystal layer, and thereby the transition temperature $T_{NI}$ of the first liquid crystal layer is lowered. Accordingly, the light entering from the illumination optical system 2 is less absorbed, decomposition of the liquid crystal material by light absorption is inhibited, and the life of the first liquid crystal layer is extended.

The following Table 2 shows the results of experiments investigating changes in life of liquid crystal layers due to a difference in liquid crystal material and a difference in maximum temperature of liquid crystal. In Table 2, the condition that the maximum temperature of a liquid crystal layer is 64° C. corresponds to the condition that the liquid crystal layer of the first liquid crystal panel 32 for blue light is cooled to a temperature lower than those of the liquid crystal layers of liquid crystal panels in other color image-forming systems. The condition that the maximum temperature of a liquid crystal layer is 77° C. corresponds to the condition that the liquid crystal layer of the first liquid crystal panel 32 for blue light is cooled to a temperature similar to those of the liquid crystal layers of liquid crystal panels in other color image-forming systems.

TABLE 2

| Maximum temperature of liquid crystal layer | Transition temperature of liquid crystal layer | |
|---|---|---|
| | $T_{NI} = 96°$ C. | $T_{NI} = 110°$ C. |
| 64° C. | 2.1 | 1.5 |
| 77° C. | 1.4 | 1.0 |

In Table 2, the condition that the transition temperature $T_{NI}$ of the liquid crystal layer is 96° C. corresponds to the condition that the transition temperature $T_{NI}$ of the liquid crystal layer of the first liquid crystal panel 32 for blue light is set to be lower than those of the liquid crystal layers of liquid crystal panels in other color image-forming systems. The condition that the transition temperature $T_{NI}$ of the liquid crystal layer is 110° C. corresponds to the condition that the transition temperature $T_{NI}$ of the liquid crystal layer of the first liquid crystal panel 32 for blue light is set to be the same as those of the liquid crystal layers of liquid crystal panels in other color image-forming systems.

In the experiments, the external temperature is set to 35° C., a liquid crystal layer is irradiated with blue light, and the time (light resistance life) until that occurrence of a photodegradation reaction of the liquid crystal layer is indicated is measured. Table 2 shows the light resistance life measured under each condition by standardizing the light resistance life using the light resistance life when the transition temperature $T_{NI}$ of a liquid crystal layer is 110° C. and the maximum temperature of the liquid crystal layer is 77° C. as 1.

As obvious from Table 2, in the comparison under the condition that the transition temperature $T_{NI}$ of a liquid crystal layer is 110° C., the life of the liquid crystal layer under the condition that the maximum temperature of the liquid crystal layer is 64° C. is about 1.5-fold longer than that under the condition that the maximum temperature of the liquid crystal layer is 77° C. In the comparison under the condition that the maximum temperature of a liquid crystal layer is 77° C., the life of the liquid crystal layer under the condition that the transition temperature $T_{NI}$ of the liquid crystal layer is 96° C. is about 1.4-fold longer than that under the condition that the transition temperature $T_{NI}$ of the liquid crystal layer is 110° C. Furthermore, as in this embodiment, the life of a liquid crystal layer under the condition that the maximum temperature and the transition temperature $T_{NI}$ of the liquid crystal layer are 64° C. and 96° C., respectively, is about 2.1-fold longer than that under the condition that the maximum temperature and the transition temperature $T_{NI}$ of the liquid crystal layer are 77° C. and 110° C., respectively.

Thus, it is confirmed that the life of the first liquid crystal layer is extended with a decrease in the transition temperature $T_{NI}$ in the range of not lower than 70° C. If the transition temperature $T_{NI}$ of the first liquid crystal layer is less than 70° C., the life of the first liquid crystal layer is similar to that when the transition temperature $T_{NI}$ is 70° C. This is probably because that when the transition temperature $T_{NI}$ of the first liquid crystal layer is less than 70° C., a necessity that a compound contained in the liquid crystal material has two or more benzene rings constituting a series of π-electron conjugated system is low. That is, the transition temperature $T_{NI}$ of the first liquid crystal layer is 70° C. or more and may be 95° C. or less, 85° C. or less, or 80° C. or less.

As described above, in the projector 1 of this embodiment, the light resistance of the first liquid crystal layer 42 of the first liquid crystal panel 32 in the blue image-forming system can be remarkably improved. As a result, the life of the first liquid crystal layer 42 of the first liquid crystal panel 32 in the blue image-forming system, which tends to have the shortest life in the plurality of image forming systems 3 to 5, can be extended, and the life of the projector 1 of this embodiment can be therefore extended. In general, in the compounds used as liquid crystal materials, since the number of types of compounds having low transition temperatures $T_{NI}$ is larger than that of compounds having high transition temperatures $T_{NI}$, the degree of freedom in selection of the material can be increased.

The technical scope of the invention is not limited to the above-described embodiment. The requirements described in the embodiment can be appropriately combined. In addition, at least one of the requirements described in the embodiment may be omitted. Various modifications are possible within the range not departing from the gist of the invention.

In the above-described embodiment, the cooling mechanism 8 uses air as the coolant and cools each liquid crystal layer by heat exchange with the coolant. However, the coolant may be a liquid such as water. The cooling mechanism 8 may include a first cooling unit for cooling the first liquid crystal panel 32 for blue light independently of other liquid crystal panels and a second cooling unit for cooling the other liquid crystal panels independently of the first liquid crystal panel 32 for blue light. The first cooling unit and the second cooling unit may be each constituted of, for example, a Peltier element or of, for example, a cooling fan. Furthermore, the cooling mechanism 8 may be constituted so that the first to third liquid crystal panels are cooled by a cooling fan and that the first liquid crystal panel 32 for blue light is further cooled with a Peltier element. In addition, the cooling mechanism 8 may cool at least the first liquid crystal layer and may not cool at least one of the second liquid crystal layer and the third liquid crystal layer.

In the above-described embodiment, the first to third liquid crystal panels are constituted of reflection-type liquid crystal panels, but may be constituted of transmission-type liquid crystal panels. If the first to third liquid crystal panels are the transmission type, the quantity of light absorbed by the pixel electrode is low to reduce the maximum temperature of the liquid crystal layer, and the configuration of the cooling mechanism 8 can be simplified. Furthermore, the first to third liquid crystal panels are constituted of transmission-type liquid crystal panels, and, for example, a frame-type radiator plate may be disposed at the outer side of the pixel region as the entire area where the pixels are arrayed so that the light is not obstructed from passing through the pixel region in each liquid crystal panel.

In the above-described embodiment, the illumination optical system 2 is constituted so as to separate the white light emitted from the light source lamp 13 into three color light components and to illuminate the image forming system for each color with light of the corresponding color, and the configuration thereof is not limited as long as blue light L1 and second light L2 having a wavelength longer than that of the blue light L1 can be emitted. For example, the illumination optical system may include a solid-state light source that directly emits light of each color, such as a laser diode or a light-emitting diode, and may be configured so as to illuminate the image forming system for each color with light of the corresponding color emitted from solid-state light source of each color. Furthermore, the illumination optical system may include a solid-state light source emitting blue or ultraviolet light and a fluorescent substance that receives the source light emitted from this solid-state light source and emits light having a wavelength longer than that of the source light and may be configured so as to illuminate the image forming system with the light emitted from the fluorescent substance. In this configuration, the illumination optical system may be constituted so as to combine the light emitted from the solid-state light source and the light emitted from the fluorescent substance into white light, to separate this white light into three color light components, and to illuminate the image forming system for each color with light of the corresponding color. Furthermore, the illumination optical system may be constituted so as to separate the blue light emitted from a solid-state light source into a plurality of bundles of light with, for example, a half mirror, to illuminate the blue image-forming system with one bundle of light, and to illuminate other color image-forming systems with light having a color converted from another bundle of light by the fluorescent substance.

The color separation optical system 12 may be constituted so that white light is separated into a plurality of color light components by a dichroic prism. The color synthesizing unit 6 may be constituted so as to synthesize a plurality of color light components with a plurality of dichroic mirrors.

The entire disclosure of Japanese Patent Application No. 2011-049673, filed Mar. 7, 2011 is expressly incorporated by reference herein.

What is claimed is:

1. A projector comprising:
   an illumination optical system capable of emitting first light in a blue wavelength range and second light of a wavelength longer than that of the first light;
   a first liquid crystal panel constituted so as to include a first liquid crystal layer and capable of modulating the first light emitted from the illumination optical system;
   a second liquid crystal panel constituted so as to include a second liquid crystal layer having a transition temperature from a liquid crystal phase to an isotropic phase higher than that of the first liquid crystal layer and capable of modulating the second light emitted from the illumination optical system;
   a projection optical system projecting the first light modulated by the first liquid crystal panel and the second light modulated by the second liquid crystal panel; and
   a cooling mechanism for cooling the first liquid crystal layer so that the temperature of the first liquid crystal layer is lower than that of the second liquid crystal layer.

* * * * *